(12) United States Patent
Kim et al.

(10) Patent No.: US 8,234,456 B2
(45) Date of Patent: *Jul. 31, 2012

(54) APPARATUS AND METHOD FOR CONTROLLING THE EXCLUSIVITY MODE OF A LEVEL-TWO CACHE

(75) Inventors: Jinwoo Kim, San Jose, CA (US); Darren M. Jones, Los Altos, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,567

(22) Filed: Feb. 24, 2011

(65) Prior Publication Data

US 2011/0153945 A1    Jun. 23, 2011

Related U.S. Application Data

(63) Continuation of application No. 11/963,503, filed on Dec. 21, 2007, now Pat. No. 7,917,699.

(51) Int. Cl.
*G06F 12/00* (2006.01)
*G06F 13/00* (2006.01)
(52) U.S. Cl. ......... 711/141; 711/100; 711/118; 711/154
(58) Field of Classification Search ............ 711/100, 711/117, 118, 141, 154
See application file for complete search history.

(56) References Cited

U.S. PATENT DOCUMENTS

| | | | |
|---|---|---|---|
| 4,217,640 A * | 8/1980 | Porter et al. | 714/34 |
| 5,740,399 A | 4/1998 | Mayfield et al. | |
| 5,758,119 A | 5/1998 | Mayfield et al. | |
| 6,119,197 A * | 9/2000 | Klein | 711/2 |
| 6,542,985 B1 * | 4/2003 | Johnson et al. | 712/217 |
| 6,952,755 B2 | 10/2005 | Karube | |
| 2006/0053257 A1 | 3/2006 | Sistla et al. | |
| 2006/0143408 A1 | 6/2006 | Sistla | |
| 2006/0230226 A1 | 10/2006 | Meir et al. | |
| 2006/0288170 A1 | 12/2006 | Varma et al. | |
| 2007/0005899 A1 | 1/2007 | Sistla et al. | |
| 2007/0038814 A1 | 2/2007 | Dieffenderfer et al. | |
| 2007/0143550 A1 | 6/2007 | Rajwar et al. | |
| 2007/0156971 A1 | 7/2007 | Sistla et al. | |
| 2008/0040555 A1 | 2/2008 | Iyer et al. | |
| 2008/0256294 A1 | 10/2008 | Gill | |
| 2009/0164733 A1 | 6/2009 | Kim et al. | |

FOREIGN PATENT DOCUMENTS

EP        461926 A2    12/1991

(Continued)

OTHER PUBLICATIONS

Baer et al., "Multilevel Cache Hierarchies: Organizations, and Performance", Journal of Parallel and Distributed Computing, vol. 6, Issue 3, Jun. 1989, pp. 451-476.

(Continued)

*Primary Examiner* — Tuan V. Thai
(74) *Attorney, Agent, or Firm* — Cooley LLP

(57) ABSTRACT

A method of controlling the exclusivity mode of a level-two cache includes generating level-two cache exclusivity control information at a processor in response to an exclusivity mode indicator, and utilizing the level-two cache exclusivity control information to configure the exclusivity mode of the level-two cache.

23 Claims, 4 Drawing Sheets

FOREIGN PATENT DOCUMENTS

JP        11232172 A    8/1999

OTHER PUBLICATIONS

Baer et al., "On the Inclusion Properties for multi-Level Cache Hierarchies", ACM SIGARCH Computer Architecture News, vol. 16, No. 2, May 1998, pp. 73-80.

Jouppi, "Improving Direct-Mapped Cache Performance by the Addition of a Small Fully-Associative Cache and Prefetch Buffers", ACM SIGARCH Computer Architecture News, vol. 18, No. 3a, Jun. 1990, pp. 364-373.

Pomerene et al., "Second Level Cache for MP Systems", IBM Technical Disclosure Bulletin, IPCOM000042727D, Jun. 1, 1984, 1 pg.

Chappell, Office Action mailed May 4, 2010, U.S. Appl. No. 11/963,503, 53 pgs.

Thai, Final Office Action mailed Oct. 14, 2010, U.S. Appl. No. 11/963,503, 56 pgs.

Thai, Notice of Allowance mailed Dec. 17, 2010, U.S. Appl. No. 11/963,503, 4 pgs.

* cited by examiner

APPARATUS AND METHOD FOR CONTROLLING THE EXCLUSIVITY MODE OF A LEVEL-TWO CACHE

CROSS-REFERENCE TO RELATED APPLICATIONS

This application is a continuation of U.S. patent application Ser. No. 11/963,503 filed Dec. 21, 2007 entitled "Apparatus And Method For Controlling The Exclusivity Mode Of A Level-Two Cache," which is incorporated herein by reference in its entirety.

FIELD OF THE INVENTION

The present invention relates generally to data processors. More particularly, this invention relates to a technique for controlling the exclusivity mode of a level-two cache used by one or more data processors.

BACKGROUND OF THE INVENTION

The memory access time of a processor can be reduced by using cache memory, which is generally smaller and faster than main system memory. A cache hit occurs if a memory location that is needed by the processor is found in the cache. The probability of a cache hit can be increased by storing the most recently accessed data in the cache, and by increasing the cache size. However, cache access time typically also increases with cache size. Because of this trade-off, many processors use multi-level caches. In a two-level cache, for example, the level-one (L1) cache can be both substantially smaller and faster than the level-two (L2) cache. This minimizes the cache access time for the most recently accessed data, while also maintaining an access time faster than main system memory access for a substantial amount of recently accessed data.

Multi-level cache systems may be strictly exclusive, substantially exclusive, non-exclusive, or strictly inclusive. In a strictly exclusive multi-level cache system, data must reside in at most one of the L1 and L2 caches. In a substantially exclusive multi-level cache system, data resides in at most one of the L1 and L2 caches under common operating conditions. In a non-exclusive multi-level cache system, data may reside in either or both of the L1 and L2 caches. In a strictly inclusive multi-level cache system, all data in the L1 cache must also reside in the L2 cache. In the remainder of this specification, multi-level cache systems that may be strictly exclusive or substantially exclusive are referred to as exclusive multi-level cache systems.

The selection of a type of multi-level cache system involves design trade-offs. An exclusive multi-level cache system can store more data than a non-exclusive or strictly inclusive cache system, which increases the probability of a cache hit. However, exclusive multi-level cache systems can also be more complex, which under some conditions may increase associated processing overhead.

Multi-level cache systems commonly operate in a single exclusivity mode, which may be strictly exclusive, substantially exclusive, non-exclusive, or strictly inclusive. However, depending on the task to be performed, an exclusive multi-level cache system may have better average memory access time than a non-exclusive or strictly inclusive multi-level cache system, or vice versa. In addition, though an L2 cache may be capable of operating in an exclusive, a non-exclusive, or a strictly inclusive multi-level cache system, processors are generally more restricted. There are some processors that work with only non-exclusive or strictly inclusive multi-level cache systems, and other processors that work with only exclusive multi-level cache systems. Moreover, an L2 cache may have similar restrictions to those just described for processors. In view of the foregoing, it would be desirable to provide a technique to enable one or more processors to control a multi-level cache system so that the multi-level cache system can operate in different exclusivity modes, and to enable one or more processors to recognize the exclusivity capabilities of an L2 cache.

SUMMARY OF THE INVENTION

The invention includes a method of controlling the exclusivity mode of a level-two cache, including generating level-two cache exclusivity control information at a processor in response to an exclusivity mode indicator, and utilizing the level-two cache exclusivity control information to configure the exclusivity mode of the level-two cache.

The invention also includes a system with at least one processor, a level-two cache, and an interface between each processor and the level-two cache. Each processor includes circuitry to generate level-two cache exclusivity control information in response to an exclusivity mode indicator, and a port to convey the level-two cache exclusivity control information. An exclusivity mode of the level-two cache is configurable based on the level-two cache exclusivity control information. Each processor has an interface with the level-two cache over which the level-two cache exclusivity control information is conveyed.

The invention also includes a processor with circuitry to generate level-two cache exclusivity control information in response to an exclusivity mode indicator, and a port to convey the level-two cache exclusivity control information to configure an exclusivity mode of a level-two cache.

The invention also includes a computer readable storage medium storing executable instructions to generate level-two cache exclusivity control information in response to an exclusivity mode indicator, and to convey the level-two cache exclusivity control information to configure an exclusivity mode of a level-two cache.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
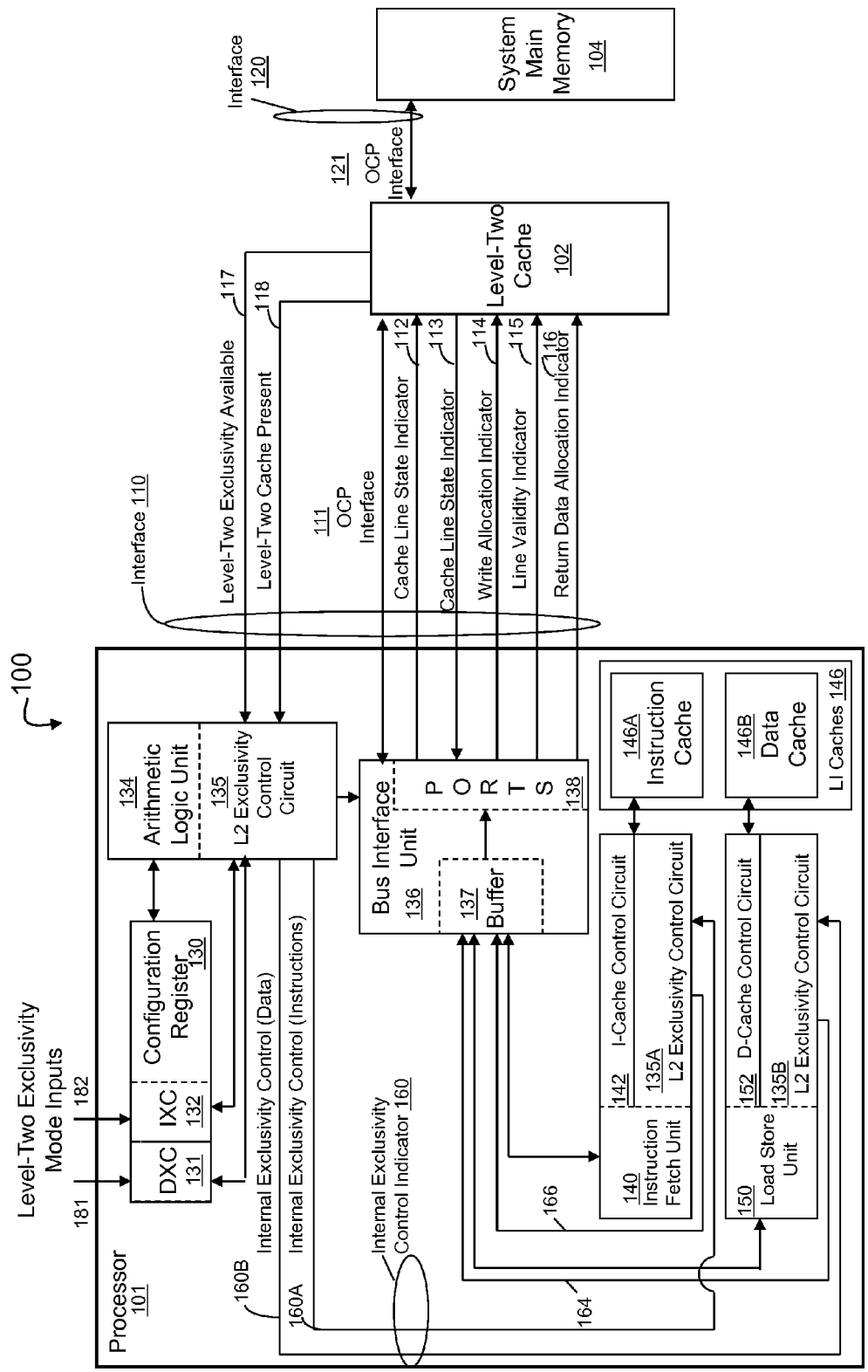
FIG. 1 illustrates a processing system that enables a processor to control the exclusivity mode of a level-two cache, in accordance with one embodiment of the present invention.

FIG. 1 illustrates a processing system 100 that enables a processor 101 to control the exclusivity mode of a level-two cache 102, in accordance with one embodiment of the present invention. The processor 101 includes an arithmetic logic unit (ALU) 122 that communicates with an instruction fetch unit (IFU) 140 and a load store unit (LSU) 150 via a bus interface unit (BIU) 136. The IFU 140 includes an instruction cache control circuit 142 that controls the instruction cache 146A. The LSU 150 includes a data cache control circuit 152 that controls the data cache 146B. The instruction cache 146A and the data cache 146B are L1 caches 146.

The processor 101 also includes a level-two exclusivity control circuit 135. In this embodiment, the ALU 134 includes the L2 exclusivity control circuit 135, which communicates with the L2 exclusivity control circuit 135A included in IFU 140, and the L2 exclusivity control circuit 135B included in LSU 150.

The processor 101 and an L2 cache 102 use an interface 110 to communicate. The interface 110 may be a parallel or a serial interface, though typically is a parallel interface. In one embodiment, the interface 110 may include, in whole or in part, the Open Core Protocol (OCP) interface 111. The processor 101 may communicate to the L2 cache 102 using the OCP master interface, and the L2 cache 102 may communicate to the processor 101 using the OCP slave interface. Each direction of the OCP interface 111 includes signals commonly found in processor-cache interfaces, such as a command bus indicating a requested transaction type, a command bus extension, an address bus, a byte enable for reads, a byte enable for writes, and a write data bus. The L2 cache 102 and the system main memory 104 also communicate using an interface 120 that may include, in whole or in part, the OCP interface 121. The L2 cache 102 may communicate to system main memory 104 using the OCP master interface, and system main memory 104 may communicate to the L2 cache 102 using the OCP slave interface. The interface 110 may include other signals beyond those defined in the OCP interface 111.

The L2 cache 102 receives a cache line state indicator from the processor 101 at node 112, and the processor 101 receives a cache line state indicator from the L2 cache 102 at node 113. The cache line state indicators at nodes 112 and 113 indicate the value of a clean/dirty flag associated with data, such as an identified cache line in the L1 data cache 146B, the L1 instruction cache 146A, or the L2 cache 102, being transferred on interface 110.

In this embodiment, the multi-level cache system can be controlled to be in either exclusive mode or non-exclusive mode. This control may be on a per transaction basis, such as per cache line transferred from the processor 101 to the L2 cache 102, or vice versa. Per-transaction control may switch between exclusivity modes on a transaction by transaction basis. This control may also be on a per processor basis.

The exclusivity mode of the multi-level cache system may be the same for instructions and for data, or different. For example, the handling of data by the L1 data cache 146B and the L2 cache 102 may be in exclusive mode while the handling of instructions by the L1 instruction cache 146A and the L2 cache 102 may be in non-exclusive mode, or vice versa.

The L2 cache 102 receives a write allocation indicator, a line validity indicator, and a return data allocation indicator from the processor 101 at nodes 114, 115, and 116, respectively. These signals are generated by the processor 101, and utilized by the L2 cache 102 to configure the exclusivity mode of the L2 cache 102. The designer may use these signals at nodes 114-116, as a group, to enable the processor 101 to communicate to the L2 cache 102 the exclusivity mode to enter, and further detailed information describing how to operate in the specified exclusivity mode.

In one embodiment, the values of the signals at nodes 114-116 for instruction-related transactions from the IFU 140 are determined by the L2 exclusivity control circuit 135A. The L2 exclusivity control circuit 135A communicates these values to the BIU 136 at node 166. The values of the signals at nodes 114-116 for data-related transactions from the LSU 150 are generated by the L2 exclusivity control circuit 135B. The L2 exclusivity control circuit 135B communicates these values to the BIU 136 at node 164.

In one embodiment, the L2 exclusivity control circuit 135A may communicate the values of the signals at nodes 114-116 to the BIU 136 for each instruction-related transaction, and the L2 exclusivity control circuit 135B may communicate the values of the signals at nodes 114-116 to the BIU 136 for each data-related transaction. In another embodiment, the L2 exclusivity control circuits 135A and 135B may communicate the values of the signals at nodes 114-116 for instruction-related and data-related transactions, respectively, to the BIU 136 only when the values change.

In one embodiment, the BIU 136 may buffer data-related transactions from the LSU 150 and instruction-related transactions from the IFU 140 in buffer 137. Since data-related transactions and instruction-related transactions may arrive at BIU 136 in parallel, the buffer 137 serves to serialize transactions communicated to the L2 cache 102. Each signal transmitted or received by processor 101 is a signal at a port 138. In this embodiment, ports 138 are shown at BIU 136, and three of the ports 138 convey L2 exclusivity control information via the signals at nodes 114-116.

The processor 101 receives a level-two exclusivity indicator and a level-two cache present indicator from the L2 cache 102 at nodes 117 and 118, respectively. In one embodiment, the ALU 134 may receive these signals. In another embodiment, the BIU 136 may receive these signals and pass these signals on to the ALU 134. The ALU 134 includes a level-two exclusivity control circuit 135 that processes these signals.

In this embodiment, the L2 cache 102 uses the L2 exclusivity available indicator at node 117 to communicate to the processor 101 whether exclusivity, such as exclusive mode, is supported by the L2 cache 102. In another embodiment, the L2 exclusivity available indicator at node 117 may communicate to the L2 exclusivity control circuit 135 both whether exclusive mode is supported by the L2 cache 102, and whether non-exclusive mode is supported by the L2 cache 102.

The L2 exclusivity control circuit 135 may determine that the L2 cache 102 is present using the L2 cache present indicator at node 118. The L2 cache present indicator at node 118 may be a line size indicator of the L2 cache 102; in this case, if the line size is zero, the L2 cache 102 is not present.

The signals received at nodes 114-118 may be mapped to reserved bits within the OCP interface 111. These signals received at nodes 114-118 are defined in Table 1.

TABLE 1

Definition of signals received at nodes 114-118 in FIG. 1.

| Signal Name | Description |
| --- | --- |
| Write Allocation Indicator | 0: Do not write-allocate on write miss |
| | 1: Write-allocate on write miss |
| Line Validity Indicator | 0: Return data and keep line valid on read hit |
| | 1: Return data and invalidate line on read hit |
| Return Data Allocation Indicator | 0: Allocate return data on read miss |
| | 1: Do not allocate return data on read miss |
| Level-Two Exclusivity Available | 0: L2 cache does not support exclusivity |
| | 1: L2 cache supports exclusivity |
| Level-Two Cache Present | 0: L2 cache is not present |
| | 1: L2 cache is present |

The processor 101 uses the write allocation indicator at node 114 to communicate to the L2 cache 102 the write allocation policy on a write miss in the L2 cache 102. In exclusive mode (Write Allocation Indicator of 1), when a write misses in the L2 cache 102, the identified line is allocated in the L2 cache 102, but not written to the system main memory 104. The identified line may be transferred to the L2 cache 102 from the L1 cache 146 via the OCP interface 111 within interface 110. In the subsequent discussion of the signals at nodes 114-118 shown in Table 1, the L1 cache 146 refers to the L1 data cache 146B for data-related transactions, and the L1 instruction cache 146A for instruction-related transactions.

In exclusive mode, a cache line state indicator including the clean/dirty state associated with the identified line is received at node 112 by the L2 cache 102, and is processed by the L2 cache 102. If the identified cache line is modified without a corresponding write-through to system main memory, then the identified cache line typically would be marked as "dirty". The "dirty" value of the clean/dirty flag typically indicates that this cached data is more current than the data in main system memory, while the "clean" value typically indicates that the cached data matches the data in main system memory. Whether "clean" or "dirty", the value of the clean/dirty flag typically should be passed with an identified cache line when the cache line is transferred from one cache to another in exclusive mode, so that the status of the identified cache line is not lost upon the transfer.

If the L2 cache 102 is full, an entry in the L2 cache 102 is selected for replacement by the identified line. The entry to be replaced may be randomly selected, the oldest entry in the L2 cache 102, the least recently used entry in the L2 cache 102, or may be selected based on some other criterion. If the entry to be replaced is a "clean" entry, that entry is invalidated and replaced by the identified line, without a write-back to the system main memory 104. If the entry to be replaced is a "dirty" entry, that entry is evicted and replaced by the identified line. In this context, eviction includes both invalidation of the entry and a write-back to the system main memory 104. The transfer of the replaced entry to the system main memory 104 may take place via the OCP interface 121 within interface 120.

In non-exclusive mode (Write Allocation Indicator of 0), when a write misses in the L2 cache 102, then the identified line is written to the system main memory 104 without being written in the L2 cache 102.

The processor 101 uses the line validity indicator at node 115 to communicate to the L2 cache 102 the line validity policy on a read hit in the L2 cache 102. In exclusive mode (Line Validity Indicator of 1), an identified line is returned from the L2 cache 102 to the processor 101 and written into the L1 cache 146. The entry in the L2 cache 102 containing a copy of the identified line is also invalidated. This is because at the end of the read operation in exclusive mode, the identified line should appear only in the L1 cache 146.

In non-exclusive mode (Line Validity Indicator of 0), an identified line is returned from the L2 cache 102 to the processor 101 and written into the L1 cache 146 without invalidating the entry in the L2 cache 102 containing a copy of the identified line, as exclusivity is not maintained.

The processor 101 uses the return data allocation indicator at node 116 to communicate to the L2 cache 102 the return data allocation policy on a read miss in the L2 cache 102. In exclusive mode (Return Data Allocation Indicator of 1), the data is passed to the processor 101 and written into the L1 cache 146 as soon as the data returns from the system main memory 104, without being written into the L2 cache 102. This is because at the end of the read operation in exclusive mode, the identified line should appear only in the L1 cache 146.

In non-exclusive mode (Return Data Allocation Indicator of 0), the data is passed to the processor 101 as soon as the data returns from the system main memory 104 and written into the L1 cache 146, and is also written into the L2 cache 102, as exclusivity is not maintained.

For a read miss or a write miss in the L1 cache 146, if the L1 cache 146 is full, then an entry in the L1 cache 146 is selected for replacement by the identified line. The entry to be replaced may be randomly selected, the oldest entry in the L1 cache 146, the least recently used entry in the L1 cache 146, or may be selected based on some other criterion.

In one embodiment, the L2 cache 102 operates differently in exclusive mode and in non-exclusive mode to handle replaced entries in the L1 cache 146. A goal in exclusive mode is to keep replaced entries in the L1 cache 146 as close to the processor 101 as possible by always ensuring that these replaced L1 entries are in the L2 cache 102. In one embodiment of exclusive mode, for example, the L1 cache 146 evicts clean L1 entries when those entries are replaced. The L2 cache 102 then receives a write request resulting from the L1 clean eviction. On a write hit in the L2 cache 102, the clean replaced L1 entry is invalidated in the L1 cache 146 but not re-written into the L2 cache 102. On a write miss in the L2 cache 102, the clean replaced L1 entry is evicted. In the context of a write miss in the L2 cache 102, eviction includes invalidation of the entry in the L1 cache 146 and write-allocation in the L2 cache 102. Since the replaced L1 entries are clean, these additional write hit and write-allocate operations are additional overhead that are not necessary to maintain exclusivity or to ensure that the replaced L1 entries are preserved. However, in exclusive mode, the performance benefit of eviction of clean replaced L1 entries may be substantial because the clean replaced L1 entries are unlikely to be found in the L2 cache 102.

In this embodiment of exclusive mode, if the replaced L1 entry is dirty, the replaced L1 entry is invalidated in the L1 cache 146. The replaced L1 entry is also written in the L2 cache 102 on a write hit in the L2 cache 102, and write-allocated in the L2 cache 102 on a write miss in the L2 cache 102.

In an embodiment of non-exclusive mode, if the replaced entry in the L1 cache 146 is clean, the replaced L1 entry is invalidated in the L1 cache 146 but not written to the L2 cache 102. If the replaced L1 entry is dirty, the replaced L1 entry is invalidated in the L1 cache 146. The replaced L1 entry is also written in the L2 cache 102 on a write hit in the L2 cache 102. But on a write miss in the L2 cache 102, the replaced L1 entry is not written to the L2 cache 102.

The identified line to be written into the L1 cache 146 may be transferred to the L1 cache 146 from the L2 cache 102 via the OCP interface 111 within interface 110. In this case, a cache line state indicator including the clean/dirty state associated with the identified line is received at node 113 by the BIU 136 and communicated to the L1 cache 146. For a data-related transaction, the BIU 136 communicates to the L1 data cache 146B via the LSU 150 and the data cache control circuit 152. For an instruction-related transaction, the BIU 136 communicates to the L1 instruction cache 146A via the IFU 140 and the instruction cache control circuit 142. The cache line state indicator is then processed by the L1 cache 146.

The replaced line in the L1 cache 146 may be transferred to the L2 cache 102 from the L1 cache 146 via the OCP interface 111 within interface 110. In this case, a cache line state indicator indicating the clean/dirty state associated with the replaced line is received at node 112 by the L2 cache 102.

In an alternative embodiment, the signals received at nodes 114-116 may be combined. For example, the write allocation indicator at node 114 and the return data allocation indicator at node 116 may be represented by a single signal with value 1 corresponding to a Write Allocation Indicator of 1 and a Return Data Allocation Indicator of 1, and with value 0 corresponding to a Write Allocation Indicator of 0 and a Return Data Allocation Indicator of 0.

In this embodiment, the L2 cache 102 uses the L2 exclusivity available indicator at node 117 to communicate to the processor 101, specifically the L2 exclusivity control circuit 135, whether exclusivity, such as exclusive mode, is supported by the L2 cache 102. In another embodiment, the L2 exclusivity available indicator at node 117 may communicate to the processor 101 both whether exclusive mode is supported by the L2 cache 102, and whether non-exclusive mode is supported by the L2 cache 102. The L2 exclusivity available indicator at node 117 is important because, first, it enables the designer to build in safeguards in the configurability of the processor 101. For example, these safeguards may ensure that the processor 101 operates in an exclusivity mode supported by the L2 cache 102.

In one embodiment, if the L2 cache 102 is only capable of operating in non-exclusive mode, the processor 101 should not be configurable to operate in exclusive mode. In another embodiment, if the L2 cache 102 is capable of operating in both exclusive and non-exclusive modes, the processor 101 should be configurable to operate in either exclusive or non-exclusive mode, assuming that the processor 101 is capable of operating in both of these modes. The L2 exclusivity available indicator at node 117 is also important because this information about the L2 cache 102 can be made visible to the user of the processing system 100 via higher layer monitoring software.

An exclusivity mode indicator indicates the exclusivity mode of the multi-level cache in the processing system 100. The exclusivity mode indicator can be accessed by higher layer monitoring software to show the exclusivity mode of the processing system 100 at a particular time. The exclusivity mode indicator may be represented by an electronic signal, or by a value contained in a field of a register. In this embodiment, the exclusivity mode indicator for data-related transactions is the DXC field 131 of the configuration register 130, and the exclusivity mode indicator for instruction-related transactions is the IXC field 132 of the configuration register 130.

The DXC field 131 and the IXC field 132 are defined in Table 2.

TABLE 2

Definition of DXC field 131 and the IXC field 132 in FIG. 1.

| Field Name | Description |
| --- | --- |
| DXC | Single-bit field implemented per processor.<br>1: System is in exclusive mode for data-related transactions.<br>0: System is in non-exclusive mode for data-related transactions. |
| IXC | Single-bit field implemented per processor.<br>1: System is in exclusive mode for instruction-related transactions.<br>0: System is in non-exclusive mode for instruction-related transactions. |

The DXC field 131 may be configured in response to the level-two exclusivity mode input 181, and the IXC field 132 may be configured in response to the level-two exclusivity mode input 182. The L2 exclusivity mode inputs 181 and 182 may allow the user of the processing system 100 to configure the exclusivity mode of the processing system 100 for data-related and instruction-related transactions, respectively. The L2 exclusivity mode inputs 181 and 182 may be electronic signals applied to pins of the processor 101, or may be an input to software running on the processor 101.

The DXC field 131 and the IXC field 132 may also be configured in response to the L2 exclusivity available indicator at node 117, in addition to the respective L2 exclusivity mode inputs 181 and 182. For example, the writability of the DXC field 131 and/or the IXC field 132 may be restricted as a safeguard to ensure that the processor 101 operates in an exclusivity mode supported by the multi-level cache of the processing system 100. In one embodiment, if L2 exclusivity is available (L2 Exclusivity Available Indicator of 1), the L2 exclusivity control circuit 135 makes the DXC field 131 and the IXC field 132 writable. The DXC field 131 and the IXC field 132, and therefore the exclusivity modes of the multi-level cache of the processing system 100 for data-related and instruction-related transactions, can then be set based on the respective L2 exclusivity mode inputs 181 and 182. If L2 exclusivity is not available (L2 Exclusivity Available Indicator of 0), the L2 exclusivity control circuit 135 makes the DXC field 131 and the IXC field 132 read-only, and sets the DXC field 131 and the IXC field 132 to 0 so that the multi-level cache of the processing system 100 is in non-exclusive mode only.

The DXC field 131 and the IXC field 132 may also be configured in response to the respective L2 exclusivity mode inputs 181 and 182, the L2 exclusivity available indicator at node 117, and the L2 cache present indicator at node 118. In one embodiment, if L2 exclusivity is available (L2 Exclusivity Available Indicator of 1) and the L2 cache 102 is present (L2 Cache Present Indicator of a non-zero value), the L2 exclusivity control circuit 135 makes the DXC field 131 and the IXC field 132 writable. The DXC field 131 and the IXC field 132, and therefore the exclusivity mode of the multi-level cache of the processing system 100, can then be set based on the respective L2 exclusivity mode inputs 181 and 182. If L2 exclusivity is not available (L2 Exclusivity Available Indicator of 0) or the L2 cache 102 is not present (L2 Cache Present Indicator of 0), the L2 exclusivity control circuit 135 makes the DXC field 131 and the IXC field 132 read-only and sets the DXC field 131 and the IXC field 132 to 0 so that the multi-level cache of the processing system 100 is in non-exclusive mode only.

The L2 exclusivity control circuit 135 may generate a distinct internal exclusivity control indicator 160 to control the operation of each L1 cache 146. In one embodiment, the internal exclusivity control indicator at node 160B controls the operation of the L1 data cache 146B in response to the value of the exclusivity mode indicator in the DXC field 131. The internal exclusivity control indicator at node 160A controls the operation of the L1 instruction cache 146A in response to the value of the exclusivity mode indicator in the IXC field 132. The internal exclusivity control indicator can signal to each L1 cache 146 whether the processing system 100 is operating in exclusive mode or non-exclusive mode, and the each L1 cache 146 can operate accordingly. The internal exclusivity control indicator at node 160B may be received by the L2 exclusivity control circuit 135B of the LSU 150. The internal exclusivity control indicator at node 160A may be received by the L2 exclusivity control circuit 135A of the IFU 140. Based on the internal exclusivity control indicator at node 160B, the data cache control circuit 152 may then control the L1 data cache 146B. Based on the internal exclusivity control indicator at node 160A, the instruction cache control circuit 142 may then control the L1 instruction cache 146A. If each internal exclusivity control indicator 160 corresponds to exclusive mode, then each corresponding L1 cache 146 may perform operations including providing a cache line state indicator along with an identified line to be transferred to the L2 cache 102, and processing a cache line state indicator received along with an identified line from the L2 cache 102. If each internal exclusivity control indicator 160 corresponds to non-exclusive mode, then each corresponding L1 cache 146 does not provide a cache line state indicator along with an identified line to be transferred to the L2 cache 102, and does not process a cache line state indicator received along with an identified line from the L2 cache 102.

In one embodiment, the L2 exclusivity control circuit 135 may provide the value of the exclusivity mode indicators in the DXC field 131 and the IXC field 132 to BIU 136. The BIU 136 may use this information to determine whether to use default information to set the values of signals 114-116. For example, the BIU may use default information to set the values of signals 114-116 for data-related transactions if exclusive mode is not supported for data-related transactions, and for instruction-related transactions if exclusive mode is not supported for instruction-related transactions. This default information may be stored in a register in the BIU 136, or may be communicated to the BIU 136 by the L2 exclusivity control circuit 135.

Figure 2:
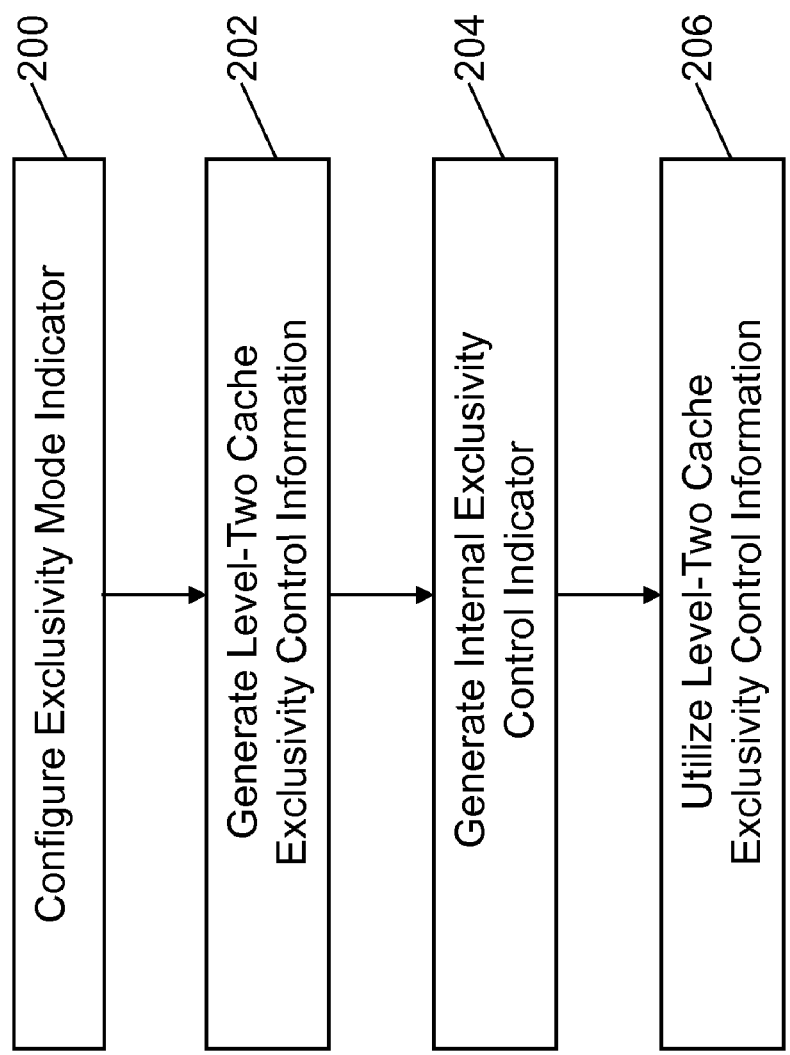
FIG. 2 illustrates operations associated with controlling the exclusivity mode of a level-two cache, in accordance with one embodiment of the present invention.

FIG. 2 illustrates operations associated with controlling the exclusivity mode of a level-two cache 102, in accordance with one embodiment of the present invention. An exclusivity mode indicator, such as the DXC field 131 and the IXC field 132, may be configured (block 200) as described in FIG. 1, or may be set to a single, non-configurable value. L2 cache exclusivity control information, such as the signals at nodes 114-116 described in FIG. 1, are then generated at the processor 101 in response to the exclusivity mode indicator. (block 202) An internal exclusivity control indicator, such as the internal exclusivity control indicator at nodes 160A and 160B described in FIG. 1, may then be generated in response to the exclusivity mode indicator to control each L1 cache 146. (block 204) The L2 cache 102 utilizes the L2 cache exclusivity control information to configure the exclusivity mode of the L2 cache 102, as described in FIG. 1. (block 206) Also as described in FIG. 1, the operation of the L1 caches 146 are affected by the internal exclusivity control indicators 160, and the operation of the L2 cache 102 is affected by the L2 cache exclusivity control information.

Figure 3:
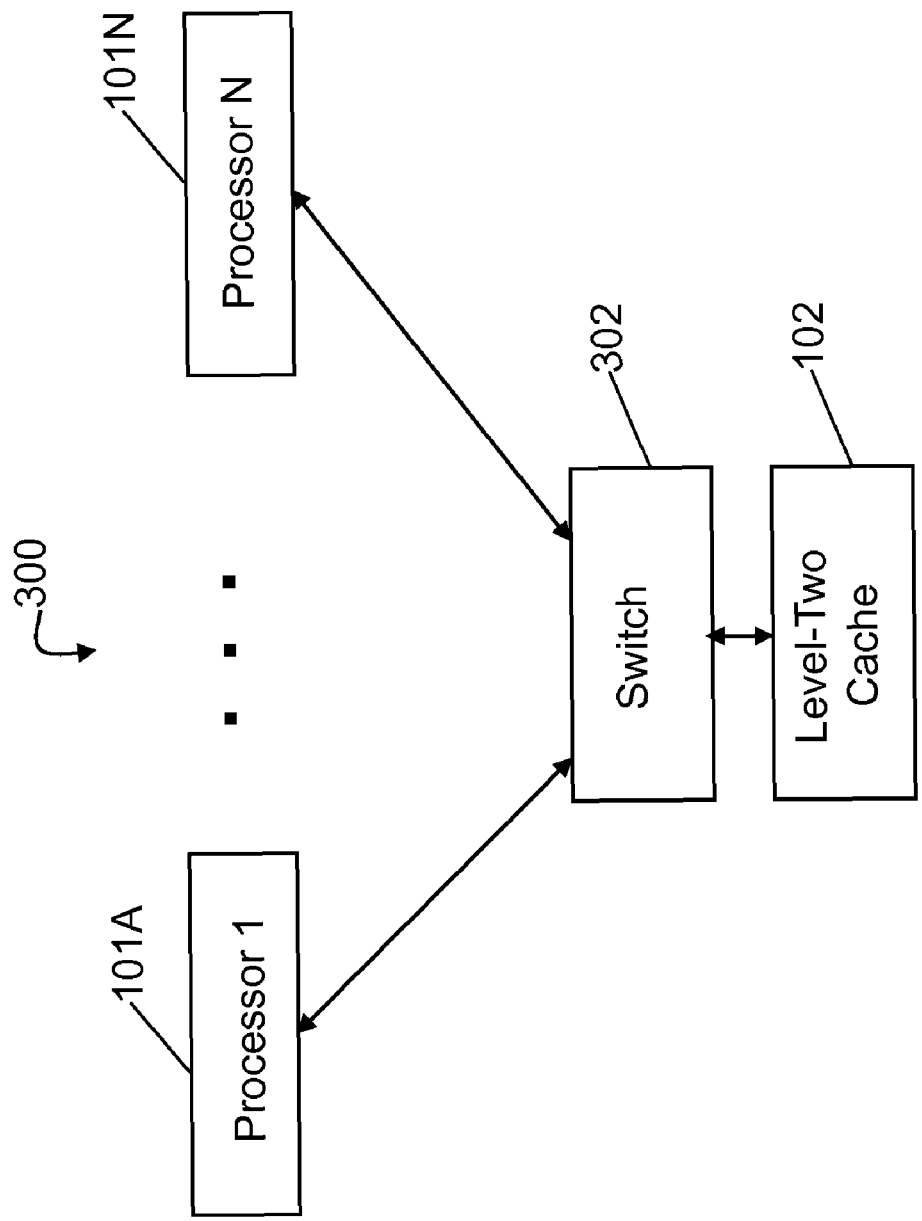
FIG. 3 illustrates a processing system with multiple processors, in accordance with one embodiment of the present invention.

FIG. 3 illustrates a processing system 300 with multiple processors 101A-101N, in accordance with one embodiment of the present invention. An L2 cache 102 typically has a single processor interface. In one embodiment, the multiple processors 101 can share the L2 cache 102 by using a switch 302 that time-multiplexes data and control traffic from the processors 101 onto the processor interface of the L2 cache 102. At any given time, the L2 cache 102 is communicating with one of the multiple processors 101. An individual processor 101A has its own distinct exclusivity mode that may be configured for that individual processor 101A as described in FIG. 2. Therefore, the L2 cache 102 may be in a first per-processor exclusivity mode configurable based on L2 cache exclusivity control information received from processor 101A, in a second per-processor exclusivity mode configurable based on L2 cache exclusivity control information received from processor 101B, and so on for processors 101C-101N. The per-processor exclusivity mode may be strictly exclusive, substantially exclusive, non-exclusive, or strictly inclusive. The first per-processor exclusivity mode associated with processor 101A may be the same as, or different from, the second per-processor exclusivity mode associated with processor 101B, and so on for processors 101C-101N.

Figure 4:
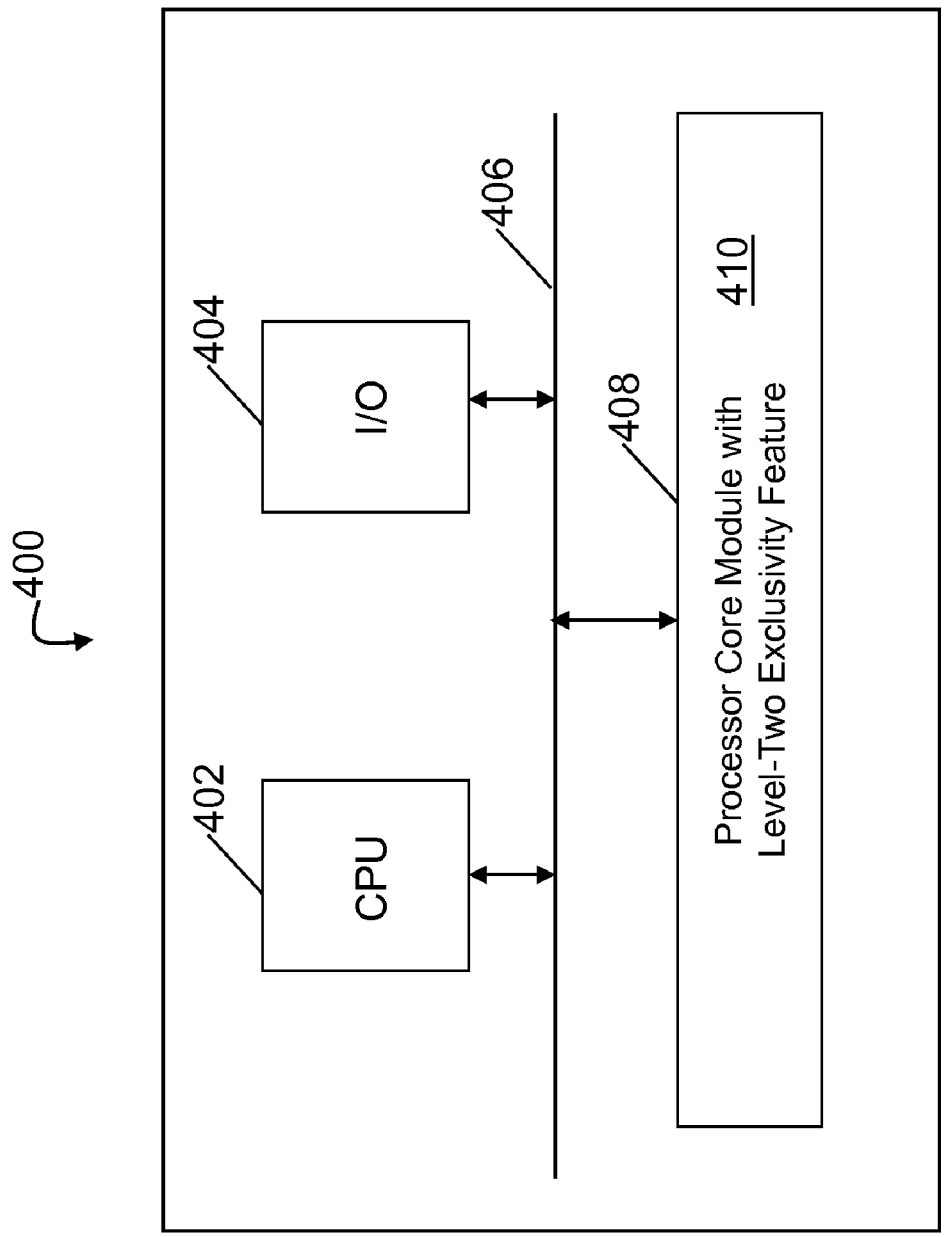
FIG. 4 illustrates an apparatus configured in accordance with one embodiment of the present invention.

FIG. 4 illustrates an apparatus 400 configured in accordance with one embodiment of the present invention. The apparatus 400 includes a central processing unit (CPU) 402 connected to a bus 406. Input/output devices 404 are also connected to the bus 406, and may include a keyboard, mouse, display, and the like. A memory 408 is also connected to the bus 406.

An executable program 410 representing a processor core module with an L2 exclusivity feature is stored in memory 408. The program 410 models the processor 101 of FIG. 2, including the interface 110 with the L2 cache 102. In particular, the program 410 generates L2 cache exclusivity control information in response to an exclusivity mode indicator, and conveys the L2 cache exclusivity control information to configure an exclusivity mode of an L2 cache associated with the processor. The processor 101 modeled by the program 410 may be configured as described in FIG. 1. The program 410 may also generate an internal exclusivity control indicator as described in FIG. 1, where the internal exclusivity control indicator may be a software command. In an alternative embodiment, there may be multiple programs 410 stored in memory 408, each program modeling a processor 101A-01N described in FIG. 3. The switch 302 may be a physical switch that time-multiplexes the output signals generated by the programs 410, or the switch 302 may be modeled by another program stored in memory 408. The L2 cache 102 may be modeled by a program stored in memory 408. The processor core module 410 may be delivered to a customer who combines the core module 410 with other modules, such as an L2 cache module, to specify a system for fabrication.

The L2 cache 102 as described in the above embodiments is a unified level-two cache, as it can hold both instructions and data. In an alternative embodiment, there may be a first level-two cache for instructions and a second, separate level-two cache for data. In this case, there may be two separate interfaces 110, one between each respective level-two cache and the processor 101. The first level-two cache and the second level-two cache may be physically separate level-two caches or distinct portions of an executable program modeling level-two caches. Alternatively, the first level-two cache and the second level-two cache may be partitions of a single physical level-two cache.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/ or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

What is claimed is:

1. A method of controlling the exclusivity mode of a level-two cache, comprising:
    generating level-two cache exclusivity control information at a processor in response to an exclusivity mode indicator; and
    utilizing the level-two cache exclusivity control information to configure an exclusivity mode of the level-two cache;
    in a first mode configured by the exclusivity mode indicator, evicting an entry in a level-one cache that is marked as clean, wherein evicting the entry includes write-allocating the entry in the level-two cache; and
    in a second mode configured by the exclusivity mode indicator, invalidating the entry in the level-one cache without write-allocating the entry in the level-two cache.

2. The method of claim 1, wherein the exclusivity mode of the level-two cache includes a first per-processor exclusivity mode that is configurable based on first level-two cache exclusivity control information generated by a first processor, and a second per-processor exclusivity mode that is configurable based on second level-two cache exclusivity control information generated by a second processor.

3. The method of claim 1, wherein the level-two cache exclusivity control information includes at least one of a write allocation indicator associated with a write miss to the level-two cache, a line validity indicator associated with a read hit to the level-two cache, and a return data allocation indicator associated with a read miss to the level-two cache.

4. The method of claim 3, wherein the level-two cache operates in substantially exclusive mode.

5. The method of claim 3, wherein the level-two cache operates in substantially exclusive mode, wherein a second level-two cache is controlled by second level-two cache exclusivity control information, and wherein the second level-two cache operates in non-exclusive mode.

6. The method of claim 1, further comprising:
    in a first mode configured by the exclusivity mode indicator, operating in an exclusive caching mode for a first type of transaction and operating in a non-exclusive caching mode for a second type of transaction.

7. The method of claim 6, wherein the level-two cache operates in a substantially exclusive caching mode for data and the non-exclusive caching mode for instructions.

8. The method of claim 1, further comprising processing a first cache line state indicator associated with a write miss to the level-two cache.

9. The method of claim 8, further comprising processing a second cache line state indicator from the level-two cache, wherein the second cache line state indicator is associated with a read to the level-two cache.

10. The method of claim 1, further comprising configuring the exclusivity mode indicator in response to an exclusivity available indicator from the level-two cache.

11. The method of claim 10, further comprising configuring the exclusivity mode indicator in response to a level-two cache present indicator from the level-two cache.

12. The method of claim 11, further comprising generating an internal exclusivity control indicator at the processor in response to the exclusivity mode indicator.

13. A system, comprising:
    at least one processor, each of the at least one processors with:
        circuitry to generate level-two cache exclusivity control information in response to an exclusivity mode indicator; and
        a port to convey the level-two cache exclusivity control information;
    a level-two cache, wherein an exclusivity mode of the level-two cache is configurable based on the level-two cache exclusivity control information; and
    an interface between each of the at least one processors and the level-two cache, and over which the level-two cache exclusivity control information generated by each of the at least one processors is conveyed; and
    circuitry that:
        in a first mode configured by the exclusivity mode indicator, evicts an entry in a level-one cache that is marked as clean, wherein evicting the entry includes write-allocating the entry in the level-two cache; and
        in a second mode configured by the exclusivity mode indicator, invalidates the entry in the level-one cache without write-allocating the entry in the level-two cache.

14. The system of claim 13, wherein the exclusivity mode of the level-two cache includes a first per-processor exclusivity mode that is configurable based on first level-two cache exclusivity control information generated by a first processor, and a second per-processor exclusivity mode that is configurable based on second level-two cache exclusivity control information generated by a second processor.

15. The system of claim 13, wherein the exclusivity mode indicator is configured in response to an exclusivity available indicator from the level-two cache.

16. The system of claim 13, further comprising circuitry to generate an internal exclusivity control indicator at the at least one processor in response to the exclusivity mode indicator.

17. A processor, comprising:
    circuitry to generate level-two cache exclusivity control information in response to an exclusivity mode indicator;
    a port to convey the level-two cache exclusivity control information to configure an exclusivity mode of a level-two cache; and
    circuitry that:
        in a first mode configured by the exclusivity mode indicator, evicts an entry in a level-one cache that is marked as clean, wherein evicting the entry includes write-allocating the entry in the level-two cache; and in a second mode configured by the exclusivity mode indicator, invalidates the entry in the level-one cache without write-allocating the entry in the level-two cache.

18. The processor of claim 17, further comprising circuitry to configure the exclusivity mode indicator in response to an exclusivity available indicator from the level-two cache.

19. The processor of claim 17, further comprising circuitry to generate an internal exclusivity control indicator at the processor in response to the exclusivity mode indicator.

20. A computer readable storage medium storing executable instructions to:

generate level-two cache exclusivity control information in response to an exclusivity mode indicator;

convey the level-two cache exclusivity control information to configure an exclusivity mode of a level-two cache;

in a first mode configured by the exclusivity mode indicator, evict an entry in a level-one cache that is marked as clean, wherein evicting the entry includes write-allocating the entry in the level-two cache; and in a second mode configured by the exclusivity mode indicator, invalidate the entry in the level-one cache without write-allocating the entry in the level-two cache.

21. The method of claim 20, wherein the exclusivity mode of the level-two cache includes a first per-processor exclusivity mode that is configurable based on first level-two cache exclusivity control information generated in response to a first exclusivity mode indicator, and a second per-processor exclusivity mode that is configurable based on second level-two cache exclusivity control information generated in response to a second exclusivity mode indicator.

22. The computer readable storage medium of claim 20, further comprising executable instructions to configure the exclusivity mode indicator in response to an exclusivity available indicator from the level-two cache.

23. The computer readable storage medium of claim 20, further comprising executable instructions to generate an internal exclusivity control indicator in response to the exclusivity mode indicator.

* * * * *